Patented June 3, 1952

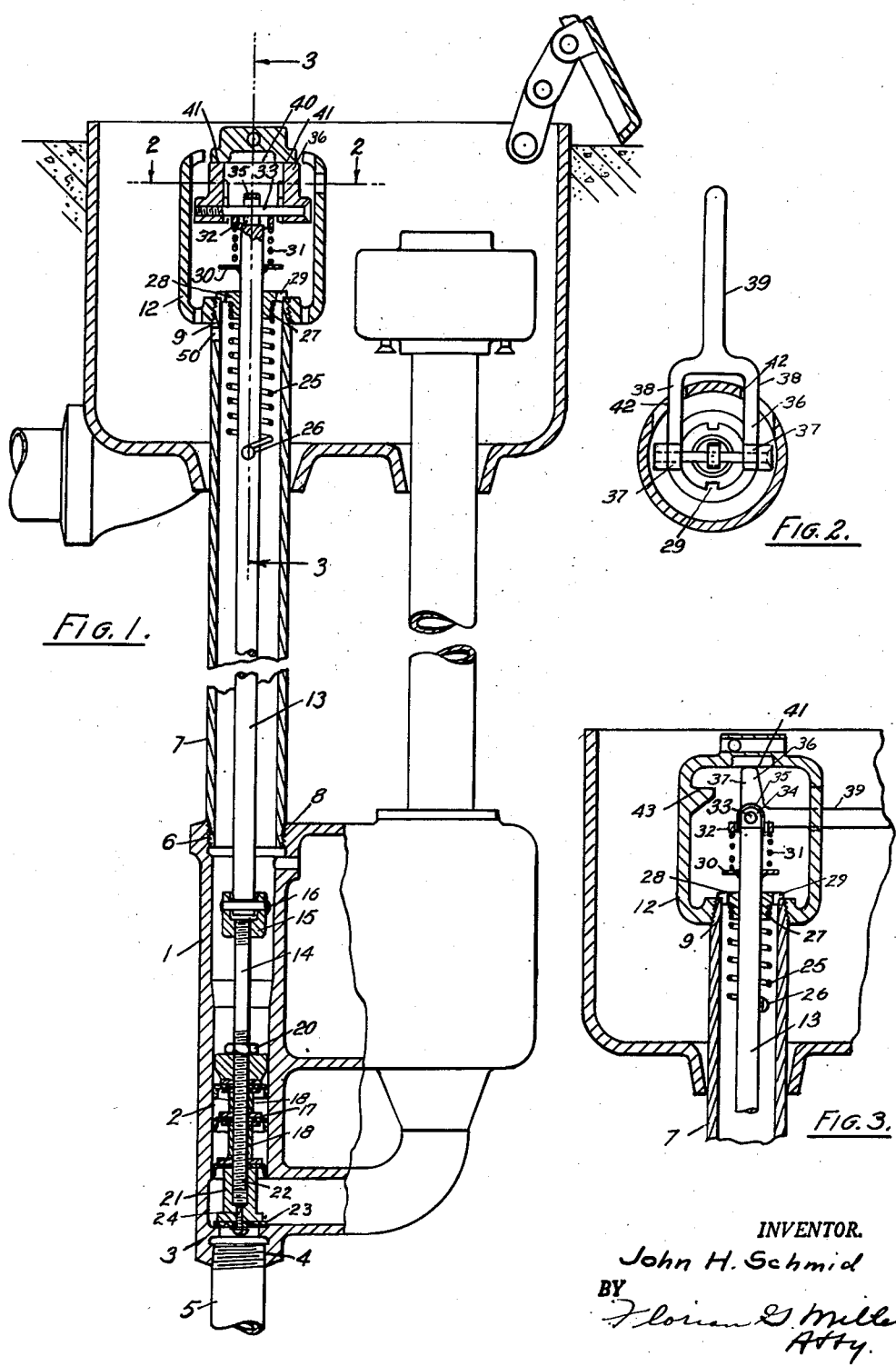

2,599,204

UNITED STATES PATENT OFFICE 2,599,204

VALVE OPERATING MECHANISM

John H. Schmid, Erie, Pa., assignor to J. A. Zurn Manufacturing Company, Erie, Pa., a corporation of Pennsylvania Application April 4, 1947, Serial No. 739,422

9 Claims. (Cl. 251—134)

This invention relates generally to valve operating mechanisms and more particularly to valve operating means for valves in a non-freezing hydrant disposed a substantial distance below the surface of the earth.

It has heretofore been customary to provide threadable members in conjunction with a valve stem to move a valve into sealing relationship with a valve seat. No provision is made for wear and deterioration of the valve and seat in these prior devices with the result that leakage results after a very short period of operation. Excessive force is applied on the valve seat in these prior devices resulting in excessive wear on the seat and seating member. All connections in these prior devices between the handle and valve stem have been direct through threadable connections thereby placing excessive forces on the threads resulting in free play and excessive resisting frictional forces there between. There is no provision to take up valve wear in these prior devices.

It is, accordingly, an object of my invention to overcome the above and other defects in valve operating means and it is more particularly an object of my invention to provide valve operating mechanism for a non-freezing hydrant which is simple in construction, efficient in operation, economical in cost, and economical in manufacture.

Another object of my invention is to provide counterbalancing springs to relieve tensions in valve operating mechanisms in a non-freezing hydrant.

Another object of my invention is to provide a flexible connection between a valve operating mechanism and a valve so that wear of the valve and seat and other parts do not affect the operation of the valve.

Another object of my invention to provide a valve operating mechanism wherein all direct connections between the handle and valve stem are eliminated and direct pressure is applied to a valve stem by a spring means to compensate for wear of valve parts.

Another object of my invention is to provide a valve operating mechanism wherein the greatest force necessary for closing the valve is at a point in the rotation of the handle where greatest leverage may be applied.

Another object of my invention is to provide positive means for complementing spring means to open a valve.

Another object of my invention is to provide a valve operating mechanism which may be removed in a minimum of time.

Other objects of my invention will become evident from the following detailed description, taken in conjunction with the accompanying drawings, in which:

Fig. 1 is a vertical sectional view of a valve operating mechanism for a hydrant valve illustrating my novel invention;

Fig. 2 is a view taken on the line 2—2 of Fig. 1; and

Fig. 3 is a view taken on the line 3—3 of Fig. 1.

Referring now to the drawings, Figs. 1, 2 and 3 show a valve body 1 of a non-freezing hydrant having a vertically extending passage 2 and a valve seat 3 in threaded flanged portion 4 on the lower side of the valve body 1 for threadable connection to a threaded water pipe 5. A conventional removable valve seat (not shown) may be provided if desired. The threaded flanged portion 4 is in axial alignment with the passage 2 of the valve body 1. The valve body 1 has an internally threaded portion 6 on the upper end thereof for receiving a sleeve 7 with venting aperture 50 having a threaded portion 8 threadably engaging threaded portion 6 of the valve body 1. The sleeve 7 has a threaded portion 9 on the upper end thereof for threadably engaging the threaded bossed portion of a rectangular shaped member 12. A valve rod 13 extends concentrically of the valve sleeve 7 and passage 2 of the valve body 1 and is connected to a valve stem 14 by a U-shaped threaded coupling member 15 and a pin 16. Multiple spaced cylindrically-shaped washer members 17 are spaced along the valve stem 14 by spacing members 18 and are attached thereto and between a threaded nut 20 and a threaded member 21 threadably engaging the threaded end 22 of the valve stem 14. A valve seating member 23 for sealingly engaging the valve seat 3 of the valve body 1 is secured to the under side of the threadable member 21 by a threaded screw 24 threadably engaging a threaded aperture in the end of the member 21. A coil spring 25 is disposed in tension around the upper end of the valve rod 13 and has the lower end thereof secured to the valve rod 13 by a headed screw 26 and has the upper end thereof engaging at 27 a cap member 28 which has cut-away portions 29 for engaging the upper end of the sleeve 7. The valve rod 13 has an abutting member 30 fixed thereto, such as by welding, above the cap member 28 and engages the lower end of a comparatively heavy coil spring 31 which is substantially heavier but shorter than the spring 25. The upper end of the spring 31 is engaged by a flat annular member 32 which in turn engages a transverse shaft 33 which moves longitudinally in slotted portion 34 in the reduced end portion 35 on the upper end of the valve rod 13. The shaft 33 has fixedly and pivotally mounted thereon a cam member 36 having upwardly extending cam portions 37 on the upper side of parallel arms 38 connected to a handle 39 for moving the cam portions 37 through substantially a 90 degree arc. The upper side 40 of the member 12 has smooth cam engaging surfaces 41 on the lower surfaces thereof for engaging the upwardly extending cam portions 37 of the cam member 36 when it is moved to a position as shown in Fig. 1.

The parallel arms 38 move in parallel slots 42 in the side and top of the member 12. An outwardly projecting abutting member 43 is formed on the inner side of the member 12 to engage the cam portions 37 of the cam member 36 when the upward pressure of the springs 25 and 31 are insufficient to move the seating member 23 from the seat 3.

In operation, when it is desired to sealingly engage the valve seat 3 of the valve body 1 and the seating member 23 to shut off the flow of water from the water pipe 5, the handle 39 is moved downwardly until the cam portion 37 of the cam member 36 engages the cam engaging member 40 which forces the spring 31 downwardly against the abutting member 30 thereby forcing the valve rod 13, valve stem 14 and seating member 23 into sealing engagement with the valve seat 3 of the valve body 1. Because the length of the spring 31 is comparatively short, the handle 39 passes through a considerable portion of its travel before the spring 31 exerts any appreciable degree of pressure on the abutting member 30.

Because the spring 31 is comparatively short, maximum pressure on the handle 39 is only necessary when the handle 39 reaches nearly a horizontal position in which position maximum pressure may be applied thereto because the weight of the person can be fully applied. When it is desired to move the valve seating member 23 away from the seat 3 in the valve body 1 to permit flow of fluid from the water pipe 5, the cam members 37 are moved downwardly by raising the handle 39, thereby permitting the valve rod 13 to move upwardly through spring 25 to move the valve seating member 23 away from the valve seat 3 to permit the flow of water. The spring member 31 will come to rest after the handle 39 moves a comparatively short arcuate distance of its complete travel and the spring member 25 will move the valve seating member 23 and the sealing washers 17 a spaced distance from the valve seat 3 of the valve member 1 and hold it in an open position.

Where the valve seating member 23 and the seat 3 freeze for any particular reason, and the spring 25 does not exert adequate force to separate them, the abutting member 43 is engaged by the cam portions 37 of the cam member 36 and by moving the handle 39 in a counter-clockwise direction, the transverse shaft 33 engages the upper portion of the slotted reduced end 35 of the valve rod 13 and moves it upwardly to separate the seating member 23 and the seat 3.

It will be evident from the foregoing description that I have devised simple means for relieving the excess wear on valves and seats of a hydrant, means for compensating for wear and deterioration in the valves and seats of a hydrant, means for simplifying and reducing forces required for the closing of the valve in a hydrant and positive leverage means for opening the valve when it becomes frozen.

It will further be evident that the valve rod 13, stem 14, and seating member 23 may be simply and easily removed in that the collar 28 to which spring 25 is connected seats freely on the upper end of the sleeve 7. Furthermore, by utilization of springs, greater allowance of manufacturing tolerances is permitted, seating is positive, and the valve is quick opening.

Various changes may be made in the specific embodiment of my invention without departing from the spirit thereof, or from the scope of the appended claims.

What I claim is:

1. In combination with a valve having a seat, a valve actuating mechanism comprising a valve stem having one end thereof longitudinally slotted and a seating member connected to the other end thereof adapted to sealingly engage said seat, a spring for urging said stem and seating member away from said seat, a comparatively heavy spring for urging said stem and seating member on said seat, a transverse shaft movable in the slotted portion of said stem and in engagement with the outer end of said heavy spring, and a cam member for moving said shaft longitudinally of said valve stem whereby said seating member connected thereto is seated on said seat.

2. A valve operating mechanism for opening and closing a verticaly movable valve comprising a vertically extending sleeve, a valve rod movable in said sleeve having one end connected to said valve, a cap surrounding said rod freely mounted on the upper end of said sleeve, a comparatively light coil spring in said sleeve surrounding said rod attached to said cap, fastening means for attaching the other end of said spring to an intermediate portion of said valve rod to urge said valve to an open position, an abutting member affixed to said rod above said cap, a comparatively heavy, short coil spring surrounding said rod disposed on said abutting member, a member movable axially of said rod engageable with said heavy spring, a cam member engageable with said last mentioned member to move said member into engagement with said heavy spring and move it longitudinally against the force of said comparatively light spring to move said valve to an open position, and cam engaging means carried by said sleeve.

3. A valve operating mechanism as set forth in claim 2 wherein said cam engaging means comprises a housing disposed on the upper end of said sleeve and said cam member is an offset cam member pivotally connected to the upper end of said valve rod and engageable with the upper side of said housing to move said axially movable member against said heavy spring.

4. A valve operating mechanism as set forth in claim 3 wherein said housing has an abutment on the side thereof engageable by said cam member to positively move said valve rod longitudinally.

5. A valve operating mechanism for moving a valve rod longitudinaly to open and close a valve comprising a vertically extending sleeve, a collar freely mounted on the upper end of said sleeve, a removable valve rod extending through said collar and said sleeve, a comparatively light coil spring surrounding said valve rod in said sleeve having one end connected to said collar, fastening means for connecting the other end of said spring to said rod to move said valve rod longitudinally to open a valve, an abutting member on said rod above said collar, a comparatively heavy, short coil spring disposed on said abutting member, a longitudinally movable ring member engaging the upper end of said heavy spring, a longitudinally movable transverse shaft engaging said ring member, a cam member adapted to move said shaft longitudinally of said valve rod whereby said ring member engages the outer end of said heavy spring and moves said heavy spring and said rod against the force of said comparatively light spring to close a valve, and cam engaging means mounted on said sleeve engageable by said cam member.

6. A valve operating mechanism as set forth in claim 5 wherein said cam member comprises upwardly extending cam portions, and a handle is attached to said cam portions for moving said cam member against said cam engaging means whereby said transverse shaft, ring member, heavy spring, and valve rod are moved longitudinally of said valve rod.

7. A valve actuating mechanism comprising a longitudinally movable valve rod for opening and closing a valve having a longitudinally extending slot in one end thereof, a vertical sleeve surrounding said rod, a freely mounted cap member mounted on said sleeve and surrounding said rod, a coil spring in said sleeve connected to said cap member, means for connecting the other end of said spring to an intermediate portion of said rod to urge said valve rod upwardly, an abutting member on said rod disposed above said cap member, a comparatively heavy, short spring disposed on said abutting member surrounding said rod, a transverse shaft movable in the slotted portion of said valve rod and engageable with said heavy coil spring, a cam member pivoted on the upper end of said shaft, and a cam engaging member disposed on the upper end of said sleeve engageable by said cam member to move said transverse shaft against said heavy coil spring whereby said valve rod is moved downwardly against the force of said comparatively light coil spring.

8. A valve actuating mechanism as set forth in claim 7 wherein said cam engaging member has an abutment engageable by said cam member whereby said valve rod is positively movable upwardly.

9. A valve actuating mechanism as set forth in claim 7 wherein said cam member has a handle for operating same, said comparatively heavy spring being comparatively short so that the heavy stress on said handle is during its lower arc of movement.

JOHN H. SCHMID.

REFERENCES CITED

The following references are of record in the file of this patent:

UNITED STATES PATENTS

| Number | Name | Date |
| --- | --- | --- |
| 171,138 | James | Dec. 14, 1875 |
| 684,418 | Essex | Oct. 15, 1901 |
| 1,092,482 | Griffin | Apr. 7, 1914 |
| 1,910,909 | Werden | May 23, 1933 |
| 2,236,620 | Cornelius | Apr. 1, 1941 |